Aug. 21, 1934.     J. R. JOHNSON     1,971,157
MACHINE TOOL HEAD
Original Filed March 21, 1931
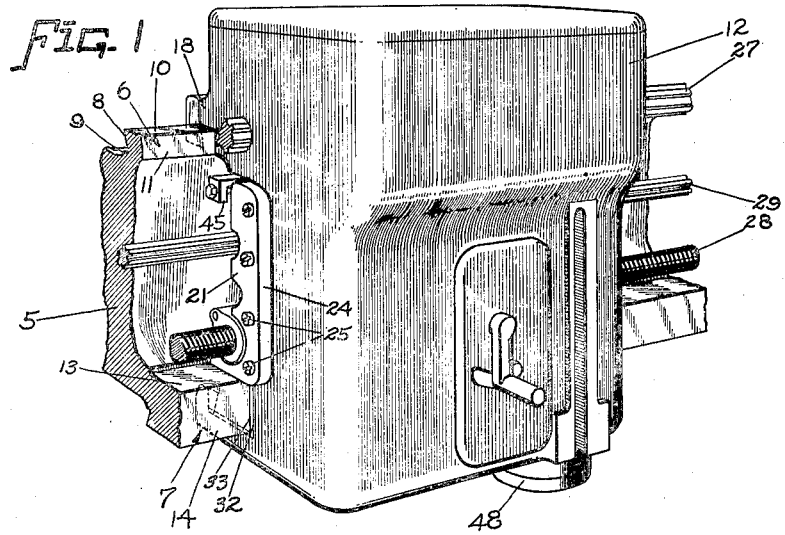
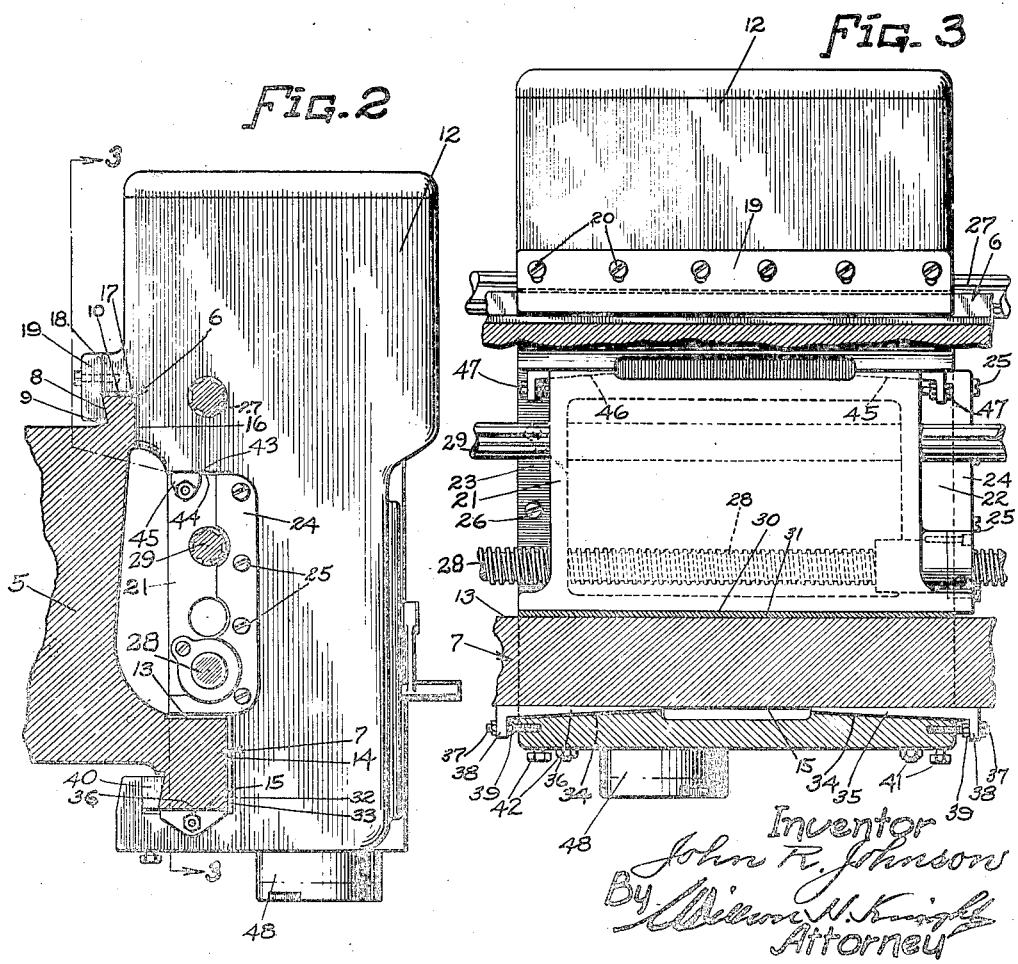

Patented Aug. 21, 1934

1,971,157

UNITED STATES PATENT OFFICE

1,971,157

MACHINE TOOL HEAD

John R. Johnson, Rockford, Ill., assignor to The Ingersoll Milling Machine Company, Rockford, Ill., a corporation of Illinois Application March 21, 1931, Serial No. 524,311
Renewed January 22, 1934

12 Claims. (Cl. 90—15)

The present invention relates in general to machine tools and has particular reference to an improved machine tool head organization more particularly to the mounting of a tool head for movement along a rail or slideway.

One object of the invention is to provide a novel mounting for a head of the above character which provides a rugged support closely adjacent the tool spindle and which enables wear on the guide surfaces to be taken up quickly and conveniently.

Another object is to provide a tool head construction of the above character arranged to permit removal of the tool spindle and head proper without removal of the shafts which project into the head for purposes of driving and feeding the latter.

The preferred application of the invention is illustrated on the accompanying drawing in which:

Fig. 1 is a view in perspective showing the head assembly applied to a machine tool rail;

Fig. 2 is a view in end elevation of the head and rail, and;

Fig. 3 is a view in rear elevation and partly in section on line 3—3, Fig. 2.

Referring now to the drawing in detail, 5 represents a horizontal rail for machine tools. This rail may be of the adjustable or stationary type and includes upper and lower slideways 6 and 7. The upper slideway 6 has a beveled back 8 terminating in a rabbeted edge 9, a top bearing 10 and a face bearing 11. The lower slideway 7 is presented in advance of the upper slideway 6 and is of heavier construction since it practically supports the whole weight of the head 12. This lower slideway 7 is fashioned with an upper bearing support 13, a face 14, and a bottom bearing 15. The bearing surfaces on these slideways 6 and 7 are all accurately finished.

The head 12 is made with slideways to fit the slideways 6 and 7 on the rail. In this connection the confronting bearing surface 16 on the upper slideway of the head comes in direct contact with the face 11 on the slideway 6 whereas there is a slight clearance between the top surface 10 and the confronting surface 17. Mounted on the back of the shoulder 18 is a clamp 19 which is made with a bevel clamping end to fit the bevel 8 on the slideway 6 of the rail. The heel of the clamp is made to fit the rabbeted edge at the end of the bevel. The clamp extends the width of the head and is detachably secured in place by a plurality of bolts 20. Each of the bolts are engaged through slotted openings in the clamp to allow for clamp adjustments. In this way a slight elevated adjustment of the clamp will pull the bearing surface 16 into place against the face 11.

Before going further into the adjustability of the mounting for the head, it should be first explained that the present organization of parts includes a saddle 21 which is inset in the head 12 in advance of the web portion of the rail and spaced therefrom. This saddle 21 is preferably fashioned as a hollow one-piece casting wider at the front than at the back to leave wing-like areas 22 and 23 at opposite sides to provide attaching flanges. One of these wings is also made with a right angle flange 24 which overlaps the side of the head and bolts 25 provide suitable securing means. The opposite wing is secured to the head by bolts 26.

Since the saddle is fitted into a pocket-like opening in the head and being bolted thereto, the head and saddle become a rigid assembly.

In addition to the adjustable features of the assembly, attention is also called to the fact that the splined shaft 27, for driving the tool spindle, is the only shaft which extends through the head per se. The feed screw 28 and the splined feed shaft 29 for feeding the tool quill up and down, both extend through the saddle. When removing the head from the rail, only the drive shaft 27 need be pulled. The saddle 21 with the operating parts mounted therein including the feed shaft and feed screw will remain in place.

The saddle is provided with a slideway 30 which slides upon the support surface 13 on the lower slideway 7 of the rail. An intervening liner 31 is provided between these bearing surfaces 30 and 13. In addition to the supporting bearing surfaces 30 and 13, the head has two other bearing contacts on the slideway 7; one as at 32 along the face 14 with an intervening liner 33 and another as at 34 along the bottom 15.

Between the bearings 34 and 15 are tapered gibs 35 and 36 each of which is made adjustable by bolts 37 which are carried in the right angle ends 38 of the gibs and threaded into tapped holes in the sides of the head. Jamb nuts 39 are provided to hold the desired adjustment. The bearing surface 15 on the bottom of the slideway 7 is finished perfectly flat, likewise the top surfaces of the gibs 35 and 36. Whereas the surfaces on the bottoms of the gibs are tapered to conform with the taper on the surface 34.

The lower slideway on the head is extended to accommodate a gib 40 which is tapered along one side to conform to the taper along the side of the lower slideway of the rail. This gib 40 is equipped with two-way adjusting bolts 41 and 42. One set of these bolts are threaded through tapped holes in the bottom of the head and terminate with their ends against the under side of the gib, and the other set of bolts are threaded through tapped holes in the bottom of the head and seat in tapped holes in the gib. With this arrangement for the bolts, one set may be used to pull down on the gib to loosen it and the other set used to impart a thrust to it to tighten the same.

In addition to the tapered gibs 35 and 36, the confronting surfaces 43 and 44 on the head and top of the saddle respectively are also separated by tapered gibs 45 and 46. These gibs are installed with adjusting bolts 47 like the bolts provided for the gibs 35 and 36.

The greater part of the wear on the slideways will be imposed on the liner 31. This liner may be made of any material suitable for the purpose and it may be secured to the bottom of the saddle in any desired manner.

The tool quill is shown as at 48. Should the spindle and quill work out of alignment due to wear on the liner 31 or for any other reason adjustments may be realized by loosening the clamp 19 and the gib 40. This will then make it possible to selectively adjust the tapered gibs 35, 36, 45, and 46 until the head has been repositioned to bring the axis of the tool spindle and quill absolutely plumb. When the proper adjustment has thus been made, the jamb nuts on the gib adjusting bolts may be tightened up to hold the adjustments thus made. After making the required readjustments, the gib 40 can be reset and the clamp 19 replaced.

In addition to the adjustable features of the assembly, the ease and simplicity of removing the head from the rail is a desirable quality of the organization of parts. In this connection, attention is called to the fact that in removing the head only, the drive shaft 27 need be pulled.

There are two possible ways of taikng the head down. One way is to pull the shaft 27, run the head out to the rail end, then remove the clamp 19, loosen the tapered gibs and the gib 40, then after the bolts 25 and 26 have been removed the head may be slid off the rail end leaving the saddle in place with the feedshaft 29 and feed screw 28 left intact.

As another method, the head need not be run out to the rail end and slid off as above described, but instead the clamp 19 can be removed, the gibs pulled out or at least loosened, and then the head pulled forward and thus removed.

It will be observed that in the head mounting above described, the slideway 7 provides lateral and both upper and lower guide surfaces which are located closely adjacent the point where the quill 48 projects from the head. Thus, the weight of the head is sustained upon the lower way while the upper slideway 6 provides the necessary lateral support and in effect constitutes a fulcrum about which the head may be tilted to effect adjustment of the spindle in perpendicular planes by manipulation of the gibs 35, 36 and 45, 46. By virtue of this arrangement, an extremely rugged support is obtained and provision is made for taking up wear quickly and conveniently.

Having thus described and shown an embodiment of this invention, what I claim and desire to secure by Letters Patent of the United States is:

1. In a machine tool head assembly, the combination of a rail or the like support, a pair of slide-ways on said support, one of said slide-ways being outwardly offset relative to the other, a saddle slidable on said outwardly offset slide-way, a tool head detachably mounted on said saddle for movement therewith, guiding means on said tool head slidably engaging both of said slide-ways and co-operating with the saddle in supporting the tool head upon the slide-ways and adjustable gibbing between the saddle and tool head and between the guiding means on the tool head and the outwardly offset slide-way for correcting the alignment of the tool head.

2. In a machine tool head assembly, the combination of a rail or the like support, a pair of slide-ways on said support, one of said slide-ways being outwardly offset relative to the other, a saddle slidably mounted on said outwardly offset slide-way, a tool head having a recessed pocket for the reception of said saddle; whereby the tool head is mounted upon the saddle for movement therewith, guiding means on said tool head slidably engaging both of said slide-ways and co-operating with the saddle in supporting the tool head upon the slide-ways, a tool spindle and quill in said tool head, a drive shaft for the tool spindle extending through the head, a screw extending through the saddle for feeding the head assembly along the slide-ways, a shaft extending through the saddle for feeding the quill and adjustable gibbing between the saddle and tool head and between the guiding means on the tool head and the outwardly offset slide-way for correcting the alignment of the tool head.

3. The combination as set forth in claim 2 and in which said adjustable gibbing is inserted in place from opposite sides of the head assembly.

4. In a machine tool, the combination of a slide-way, a separable saddle and tool head assembly mounted for sliding movement, as a unitary structure, on said slide-way, guiding means on both the tool head and the saddle engaging the slide-way and co-operating one with the other in slidably supporting the tool head on the slide-way, and adjustable gibbing between the saddle and the tool head and between the guiding means on the tool head and the slide-way for correcting the alignment of the tool head.

5. In a machine tool, the combination of a slide-way, a separable saddle and tool head assembly mounted for sliding movement, as a unitary structure, on said slide-way, guiding means on both the tool head and the saddle engaging the slide-way and co-operating one with the other in slidably supporting the tool head on the slide-way, a tool spindle and a quill in said head, a drive for the tool spindle extending through the saddle for feeding the saddle and the tool head assembly along said slide-way and a shaft extending through the saddle for feeding the quill and adjustable gibbing between the saddle and the tool head and between the guiding means on the tool head and the slide-way for correcting the alignment of the tool head.

6. In a machine tool, the combination of a slide-way, a saddle, a tool head separable from the saddle, means securing the tool head and saddle together for sliding movement as a unitary structure on said slide-way, said tool head and saddle being separably removable from the slide-way and guiding means on both the tool head and saddle engaging the slide-way and co-operating one with the other in slidably supporting the tool head and saddle on the slide-way.

7. In a machine tool head assembly, the combination of a rail or the like support, a saddle slidably mounted on said support, a tool head carried by the saddle, guiding means on both the tool head and the saddle engaging the support and cooperating one with the other in supporting the tool head and saddle on the support, means securing the tool head to the saddle for sliding movement, as a unitary structure on the support, said securing means also providing for removal of the head and saddle from the support separably and means for correcting the alignment of the tool head and saddle on said support.

8. A machine tool having, in combination, a tool head having upper, lower and lateral guide surfaces adjacent its lower end, a vertical tool spindle movably mounted in and projecting from said head closely adjacent said surfaces, a slideway having guide surfaces complemental to and cooperating with said first mentioned surfaces to sustain the weight of said head and provide rugged lateral and vertical support therefor, and a second slideway extending parallel to said first slideway and engaging said head at a point spaced from the first slideway whereby to provide lateral support for the head.

9. A machine tool having, in combination, a tool head having upper, lower and lateral guide surfaces adjacent its lower end, a vertical tool spindle movably mounted in and projecting from said head closely adjacent said surfaces, a slideway having guide surfaces complemental to and cooperating with said first mentioned surfaces to sustain the weight of said head and provide rugged lateral and vertical support therefor, adjustable gibs interposed between certain of the slideway surfaces and the cooperating head surfaces and operable to take up lateral and vertical wear, and a second slideway extending parallel to said first slideway and engaging said head at a point spaced from the first slideway whereby to provide lateral support for the head.

10. A machine tool having, in combination, a tool head having upper, lower and lateral guide surfaces adjacent its lower end, a vertical tool spindle movably mounted in and projecting from said head closely adjacent said surfaces, a slideway having guide surfaces complemental to and cooperating with said first mentioned surfaces to sustain the weight of said head and provide rugged lateral and vertical support therefor, a second slideway extending parallel to and disposed substantially above said first mentioned slideway and offset horizontally in a direction away from said head, a guide surface on said head engaging said second slideway whereby the latter provides lateral support for the head, and horizontal feed and drive shafts projecting into said head approximately in the vertical plane of said first mentioned slideway.

11. A machine tool having, in combination, a slideway, a separately formed saddle, a separately formed tool head, means detachably securing said saddle and tool head together to form a unitary head structure, guide means on said head cooperating with said slideway to guide said structure along the slideway while permitting detachment and removal of the head from the slideway, and a shaft extending parallel to said slideway and projecting into said saddle whereby said head may be detached from said slideway and saddle and removed without disturbing said shaft.

12. A machine tool having, in combination, a tool head having upper, lower and lateral guide surfaces adjacent its lower end, a vertical tool spindle movably mounted in and projecting from said head closely adjacent said surfaces, a slideway having guide surfaces complemental to and cooperating with said first mentioned surfaces to sustain the weight of said head and provide rugged lateral and vertical support therefor, gibs interposed between the complemental guide and slideway surfaces and adjustable to permit tilting of said spindle in planes parallel and perpendicular to said slideway, a second slideway spaced from and extending parallel to said first mentioned slideway, and means providing a slidable connection between said head and said second slideway which connection provides a fulcrum to permit tilting of the head by said gibs.

JOHN R. JOHNSON.